(12) United States Patent
Nakada

(10) Patent No.: US 6,513,643 B2
(45) Date of Patent: Feb. 4, 2003

(54) RESIN VESSEL CONVEYING SYSTEM

(75) Inventor: Tatsuhiro Nakada, Ishikawa-ken (JP)

(73) Assignee: Shibuya Kogyo Co., Ltd., Kanazawa (JP)

( * ) Notice: Subject to any disclaimer, the term of this patent is extended or adjusted under 35 U.S.C. 154(b) by 0 days.

(21) Appl. No.: 10/013,249

(22) Filed: Dec. 10, 2001

(65) Prior Publication Data

US 2002/0139640 A1 Oct. 3, 2002

(30) Foreign Application Priority Data

Mar. 30, 2001 (JP) ......................... 2001-101371

(51) Int. Cl.[7] .................. B65G 47/24; B65G 47/84; B65G 47/248; B65G 47/252; B65G 47/86
(52) U.S. Cl. ..................................................... 198/379
(58) Field of Search .............................. 198/379, 377.07

(56) References Cited

U.S. PATENT DOCUMENTS

| | | | |
|---|---|---|---|
| 3,848,742 A | * 11/1974 | Krenmayr | 209/111.7 |
| 4,116,325 A | * 9/1978 | McDonald | 198/484 |
| 5,241,807 A | * 9/1993 | Quick et al. | 53/594 |
| 5,328,018 A | * 7/1994 | Hoshino et al. | 198/379 |
| 5,526,832 A | * 6/1996 | Shigenatsu et al. | 134/64 |
| 5,711,411 A | * 1/1998 | Zurweller | 198/470.1 |
| 5,990,450 A | * 11/1999 | Kirker et al. | 219/388 |

FOREIGN PATENT DOCUMENTS

| | | |
|---|---|---|
| JP | 56-52256 | 12/1981 |
| JP | 2001-233448 | 8/2001 |

* cited by examiner

*Primary Examiner*—Donald P. Walsh
*Assistant Examiner*—Rashmi Sharma
(74) *Attorney, Agent, or Firm*—Flynn, Thiel, Boutell & Tanis, P.C.

(57) ABSTRACT

Resin vessels 10 are conveyed on a air conveyor 2 while they are supported at a point below a flange 10b, and are conveyed into a drier 8 which is disposed within a sterile chamber 14 through an inlet wheel 24. The drier carries resilient grippers 11 including a pair of arms which are urged toward each other by a spring to hold a vessel sandwiched therebetween. A vessel is dried up while it is rotatively conveyed as gripped by the resilient grippers, and is then returned to the air conveyor 2 through an outlet wheel 26. A reject wheel 28 is disposed upstream of the outlet wheel and includes unlockable grippers 130 which grips the vessel at a point above the flange for taking out the vessel from the drier. A reject arm 46 is disposed downstream of the reject wheel and is movable into and from a conveying path of vessels within the drier. The reject arm causes a vessel which the reject wheel failed to grasp to be dropped onto a discharge chute 30. This allows a resin vessel 10 which has been deformed under heat as a result of a machine stop over an increased length of time to be rejected positively.

7 Claims, 8 Drawing Sheets

RESIN VESSEL CONVEYING SYSTEM

BACKGROUND OF THE INVENTION AND RELATED ART STATEMENT

The present invention relates to a resin vessel conveying system, and in particular, to a resin vessel conveying system of so-called neck conveyance type in which the conveyance is referenced to a flange formed around the neck of a resin vessel.

PET bottles formed of a resin are recently extensively used as a vessel in which a liquid content is filled. Such a resin vessel is of a light weight and very unstable, and this makes it difficult for the vessel to be rapidly conveyed on a common conveyor. The neck conveyance is therefore adopted, in which the conveyance takes place while supporting the lower surface of a flange formed around the neck of the vessel from below or while gripping the neck with an unlockable gripper to suspend the vessel.

Since the neck conveyance is based on the elevation of the flange formed around the neck of the vessel, it dispenses with the need for adjusting the elevation of vessel processors, conveyors or conveying wheels when applied to vessels of differing sizes, providing an advantage of universal use.

In a vessel conveying system in which vessels are continuously conveyed and processed, in the event of a failure or outage of a processor, if the vessels are left to stay in the processor for a prolonged length of time, the heat or the atmosphere in the processor may cause a deformation or a modification in quality of the vessels, which therefore must be cleared from the processor. Accordingly, a rejector or rejectors are usually provided along a vessel conveying line to allow the vessels to be cleared in such event.

An arrangement is known for use in a vessel conveying system of neck conveyance type which allows the gripper to be opened to release a vessel at a reject position in the course of a conveying path so that the vessel can be lowered onto a rotary table to be discharged (see Japanese Patent Publication No. 52,256/1981). This known arrangement suffers from inability to accommodate for vessels of varying sizes without the adjustment of the conveyor elevation when the vessels are directly lowered onto a conveyor or a rotary table, and thus is inapplicable to a vessel conveying system which deals with vessels of varying sizes.

The present inventor has proposed a vessel conveying system of neck conveyance type which is made applicable to vessels of varying sizes by allowing vessels to be handed over while their necks are gripped or supported when vessels are to be rejected from a conveying path, and which is the subject matter of an earlier Japanese Patent Application No. 119,935/2,000.

In the disclosed vessel conveying system of this Application, there is provided a vessel processor including a revolving body carrying a plurality of resilient gripper means disposed at a given circumferential interval around the outer periphery of the body and each operable to grip a vessel resiliently. A reject mechanism is disposed at a reject position around the vessel processor and comprises an unlockable gripper means disposed at a given circumferential interval adjacent to the outer periphery of a revolving body. The unlockable gripper means can be opened or closed to release or grip a vessel. When a vessel is to be rejected, the unlockable gripper means is closed as the vessel to be rejected reaches the reject position, thereby gripping that vessel and taking it out from the resilient gripper means on the vessel processor. The vessel which is taken out from the resilient gripper means is handed over to guide means (discharge chute) formed by a pair of parallel members to be discharged.

A vessel conveying system which is provided with a rejector as mentioned above is known as a resin vessel processing line, for example, including a rinser which rinses a resin vessel such as PET bottle in a sterile chamber and dries it with a drier before delivering it from the sterile chamber to a subsequent step such as a filler. In the operation of such processing line, the stream of dry air is not interrupted in order to prevent a pressure balance in the chamber from being distributed if a machine trouble occurs to stop the movement. If the machine should stay at rest for a long time interval, a vessel or vessels which are introduced into the processor such as the drier would be subject to the heat therein and become deformed. Thus, there is a need for the rejector to clear vessels which lie in a given zone on the conveying path to the outside in a consecutive manner if the machine stops over a given time interval.

However, if the line stop continues for an increased length of time, not only the barrel having a reduced wall thickness, but also the neck of the resin vessel which is utilized for the neck conveyance may be largely deformed. If the neck is largely deformed, a vessel gripper such as the unlockable gripper means will be unable to grasp the vessel, thus preventing a discharge of the vessel by the rejector. A vessel which cannot be rejected would continue to be conveyed on the normal line, and thus a manual intervention is required to remove the vessel by stopping the machine.

OBJECT AND SUMMARY OF THE INVENTION

Accordingly, it is an object of the invention to provide a resin vessel conveying system including a reject arm capable of positively discharging a vessel, which cannot be discharged by reject means that is designed to grip and discharge a vessel, out of a conveying path.

Such object is accomplished in accordance with claim 1 by providing a resin vessel conveying system comprising a rotary conveying means including resilient gripper means disposed at an equal circumferential interval thereon and each operable to resiliently grip a vessel to convey it by engaging the latter above or below a flange formed thereon, and a rotary reject means including unlockable gripper means disposed at an equal circumferential interval thereon and each operable to open and close to grip and release a resin vessel, wherein a reject arm which is movable to and from a conveying path of the resin vessels is arranged downstream of the reject means on the conveying path, the reject arm being responsive to a reject signal to take out a resin vessel, which the reject means failed to take out of the rotary conveying means, out of the conveying path.

When a resin vessel is to be rejected, it is normally removed by the rotary reject means which grips the resin vessel. However, it is possible that the resin vessel may be deformed to a degree that it cannot be gripped by the unlockable gripper means of the rotary reject means, and such defective vessel would be carried past the reject position downstream while it is retained by the resilient gripper means of the rotary conveying means. With the resin vessel conveying system according to the invention, the reject arm arranged downstream of the reject position operates in such instance to positively discharge the vessel which the rotary reject means failed to grasp.

It will be appreciated that if the reject arm is simply moved into the conveying path, it would interfere with a vessel retained by the resilient gripper means of the rotary conveying means. Accordingly, such an interference is avoided in accordance with claim 2 by causing the reject arm to project into a space in the conveying path which is created by the operation of the reject means to take out the resin vessel.

DETAILED DESCRIPTION OF THE PREFERRED EMBODIMENT

Figure 1:
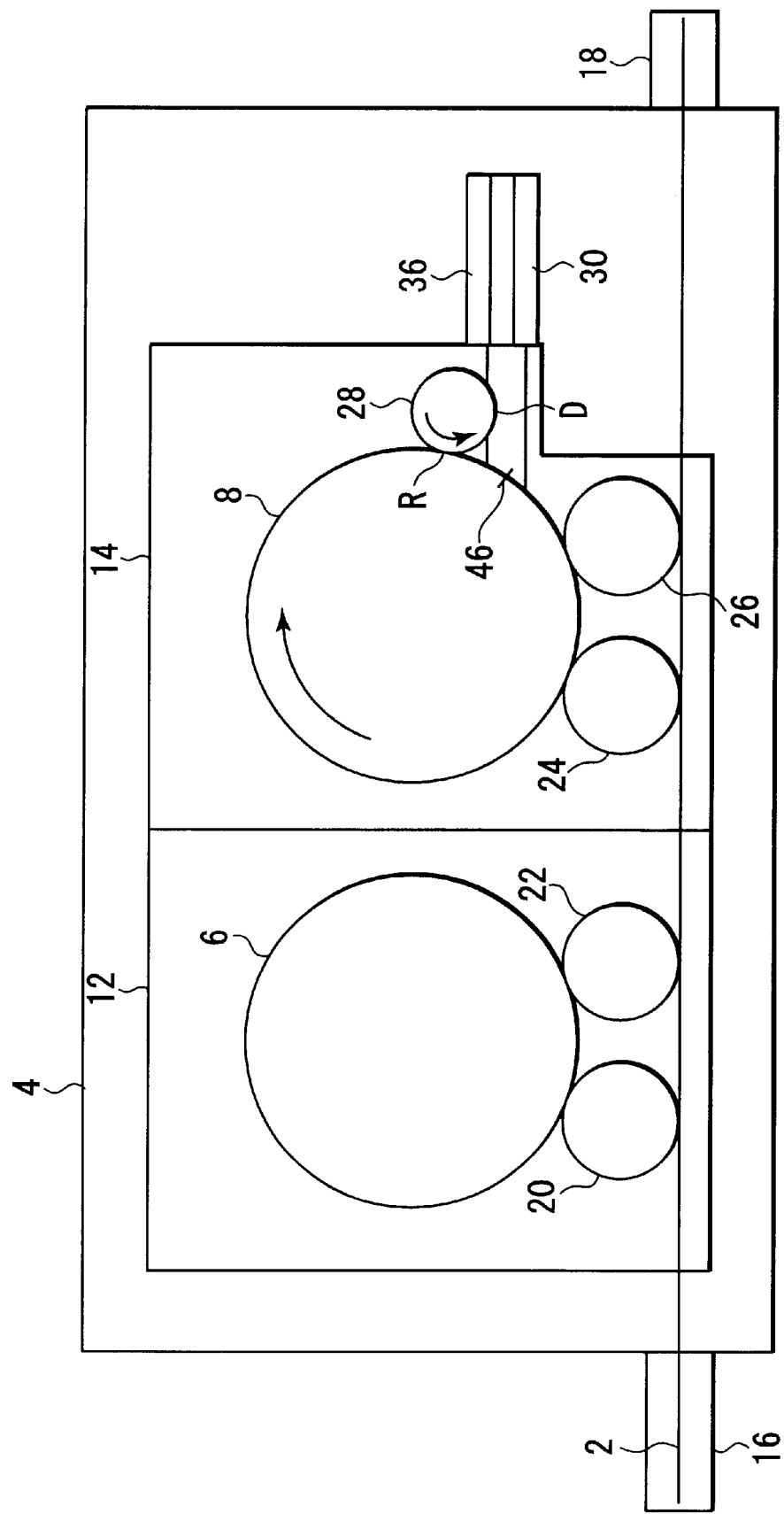
FIG. 1 is a simplified plan view of a resin vessel conveying system according to one embodiment of the present invention.
Figure 4:
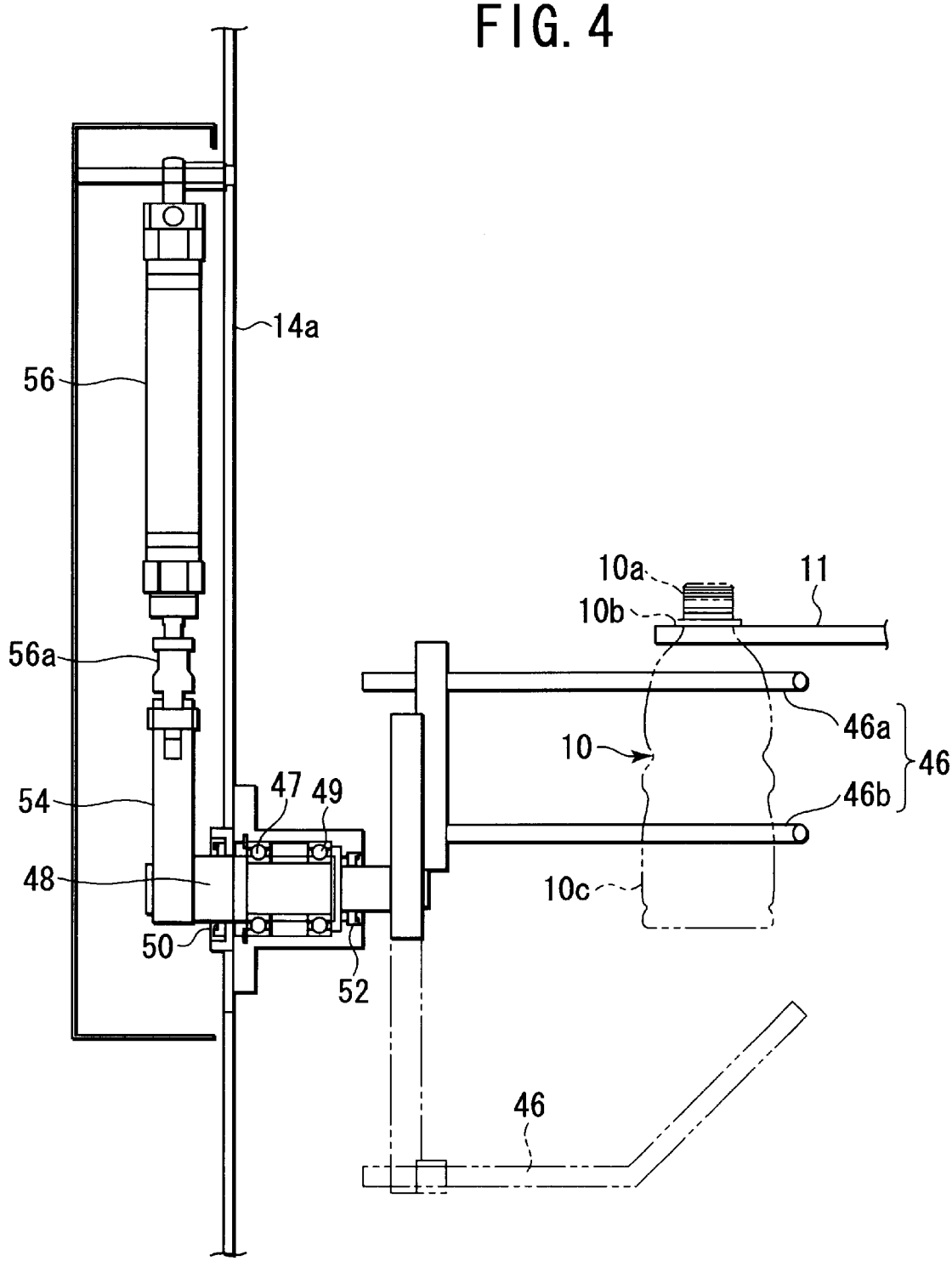
FIG. 4 is a front view showing a reject arm of the resin vessel conveying system.

Referring to the drawings, an embodiment of the invention will be described. FIG. 1 is a plan view showing a schematic arrangement of a resin vessel conveying system according to one embodiment of the present invention. The resin vessel conveying system is designed to convey resin vessels such as PET bottles on an air conveyor 2 into a processing chamber 4 in which a rinser 6 and a drier 8 are sequentially disposed where given processings are applied to the vessels to be returned to the air conveyor 2 again so as to be fed to a subsequent step, not shown. A vessel 10 which is conveyed by the present system is a PET bottle formed of a resin, as shown in FIG. 4 which will be described later, and includes a neck 10a, around which a flange 10b is formed. The neck conveyance takes place on the basis of the elevation of the flange 10b. The processing chamber 4 in which the rinser 4 and the drier 8 are disposed comprises a normal open chamber which assumes an atmospheric pressure.

It will be noted that a sterile chamber 12 which is used for the rinser and another sterile chamber 14 which is used for the drier are consecutively defined in the processing chamber 4, and the rinser 6 which cleans resin vessels 10 and the drier 8 which dries out the cleansed resin vessels 10 are provided in the chambers 12 and 14. The air conveyor 2 passes through a sterile chamber 16 which is connected upstream of the processing chamber 4 and continues through the processing chamber 4, the rinser chamber 12 and the drier chamber 14 in sequence, and then passes through a sterile chamber 18 connected downstream of the processing chamber 4 to feed a subsequent step which is located further downstream.

The resin vessel 10 which is conveyed on the air conveyor 2 is introduced into the rinser 6 in the sterile chamber 12 through an inlet wheel 20. When introduced into the rinser 6, the resin vessel 10 is cleansed while it is rotatively conveyed by being retained by a gripper, not shown, and dripped off and then discharged through an outlet wheel 22 to be handed over to the air conveyor 2 again. The rinsed resin vessel 10 is conveyed on the air conveyor 2 into the drier chamber 14 where it is conveyed into the drier 8 through a second inlet wheel 24. While not shown, a plurality of unlockable gripper means which open or close by causing either one or both of a pair of grip members to rock are disposed at an equal circumferential interval along the outer periphery of the second inlet wheel 24, and the resin vessel 10 which is conveyed by the air conveyor 2 by having its lower surface of the flange 10b supported is engaged by the unlockable gripper means at a location above the flange 10b to be handed over to the drier 8.

A plurality of resilient gripper means 11 (see FIG. 5) are disposed at an equal circumferential interval around the drier 8, and each resilient gripper means 11 includes a pair of arms which are resiliently urged as by a spring toward each other to hold the neck 10a of the vessel 10 therebetween. When the resin vessel 10 is handed over from the unlockable gripper means on the second inlet wheel 24, it continues to be gripped by the resilient gripper means while it is being conveyed. A dry heated air is supplied into the sterile chamber 14 in which the drier 8 is disposed, and the resin vessel 10 which is rinsed by the rinser 6 is dried up while it is rotatively conveyed as its neck 10a is gripped by the resilient gripper means 11 of the drier 8.

Figure 5:
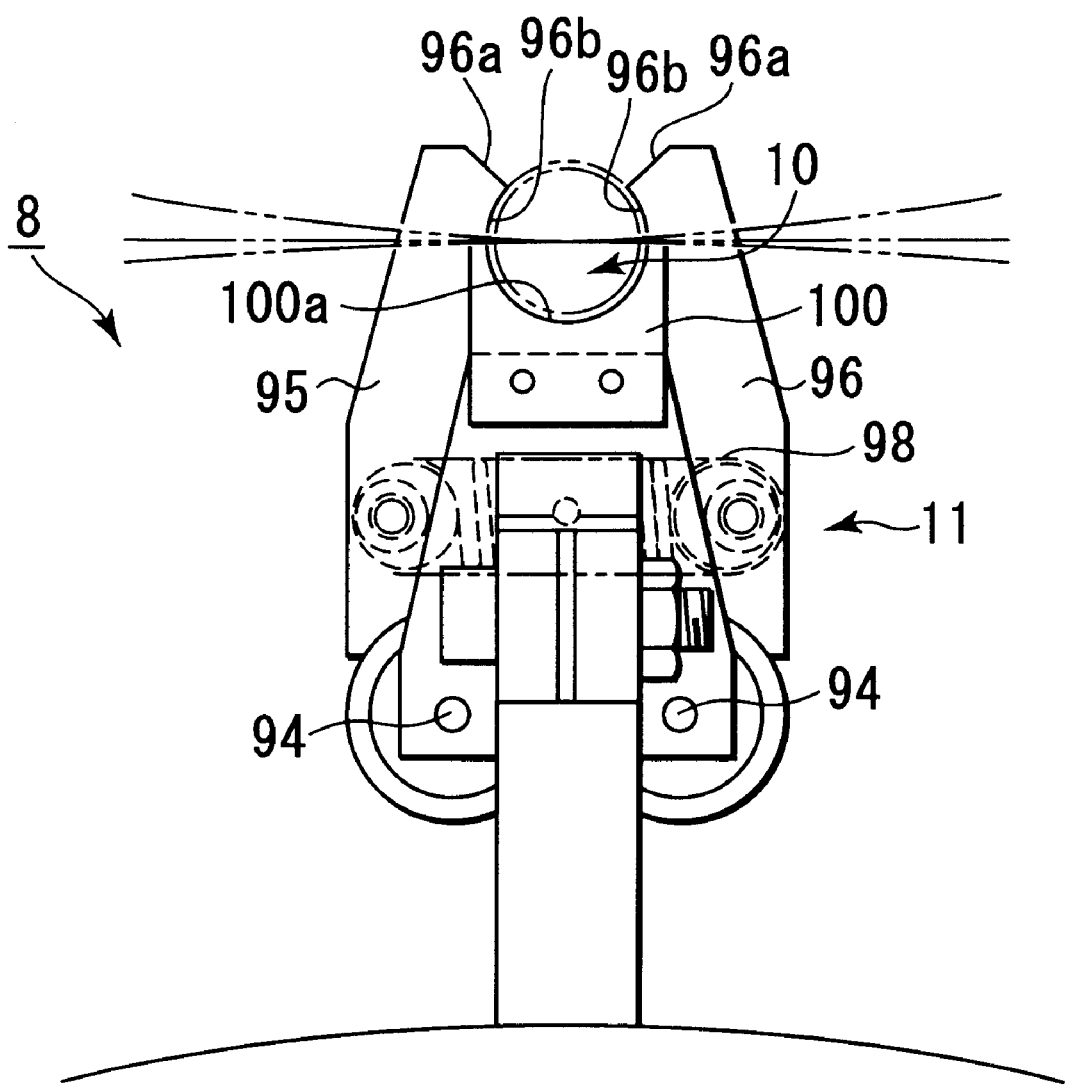
FIG. 5 is a plan view showing one example of resilient gripper means.

The resilient gripper means 11 will be described with reference to FIG. 5. A pair of vertical pivots 94 are fixedly mounted around the outer periphery of a revolving body for rotatably supporting one end of each arm 96 with a bearing interposed therebetween. The both arms 96 are urged toward each other by a tension spring 98. The opposite end of each arm 96 is formed with a notch 96a which is tapered to facilitate the insertion of the neck 10a of the vessel 10 into a space defined between the both arms 96. The notches 96a continue to arcuate portions 96b having an internal diameter which substantially corresponds to the external diameter of the neck 10a of the vessel 10. The combination of the arms 96, the tension spring 98 and the pivots 94 constitute together resilient gripper means 11 which resiliently grip the vessel 10.

A neck support plate 100 is disposed slightly above the arms 96 for abutment against the neck 10a of the vessel 10 which is retained by the resilient gripper means 11 to stabilize its attitude. It will be noted that, on its front side, the plate 100 is formed with an arcuate recess 100a of an internal diameter which substantially coincides with the external diameter of the neck 10a of the vessel 10.

The resin vessel 10 which is dried up by the drier 8 is then handed over to the air conveyor 2 through a second outlet wheel 26 to be delivered to a subsequent step. A plurality of unlockable gripper means similar to those provided on the second inlet wheel 24 are disposed at an equal circumferential interval on the second outlet wheel, and each of the unlockable gripper means operates to grasp the resin vessel 10 which is retained by the resilient gripper means 11 on the drier 8 to take it therefrom to be handed over to the air conveyor 2.

It will be noted that a reject wheel (or reject means) 28 is disposed slightly upstream of the second outlet wheel 26 for the drier 8. The reject wheel 28 carries a plurality of unlockable gripper means which are disposed at an equal circumferential interval thereon, each including a pair of arms constructed in the similar manner as the unlockable gripper means provided on the second inlet wheel 24 and the second outlet wheel 26 and operating in the similar manner to grasp the vessel 10 when the pair of arms are closed and to release the vessel when the arms are opened. However, it is to be noted that the unlockable gripper means on the reject wheel 28 can be locked by lock means while maintaining the arms in their open condition. During the normal run of the production line, the unlockable gripper means on the reject wheel 28 remain locked in the open condition to pass by a reject position R, which is defined as a point of contact between the drier 8 and the reject wheel 28. However, when a machine trouble occurs to stop the movement and it becomes necessary to reject the resin vessels 10 which stay within the drier 8, the unlockable gripper means on the reject wheel is unlocked to permit its arms to be opened or closed, thus allowing one of the resin vessels 10 to be gripped at the reject position R and to be removed from the resilient gripper means 11 on the drier 8.

Figure 7:
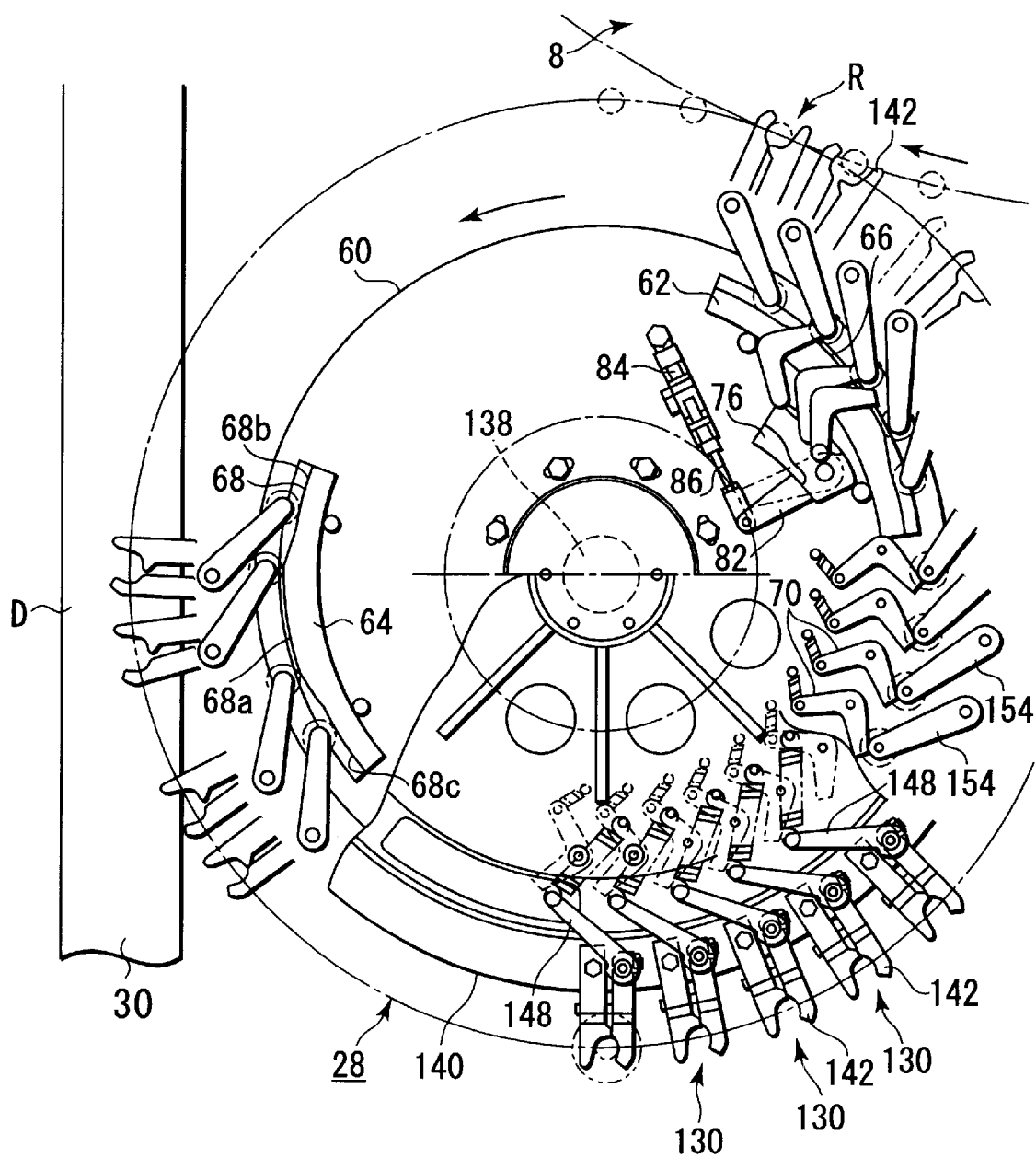
FIG. 7 is a plan view of reject means.
Figure 8:
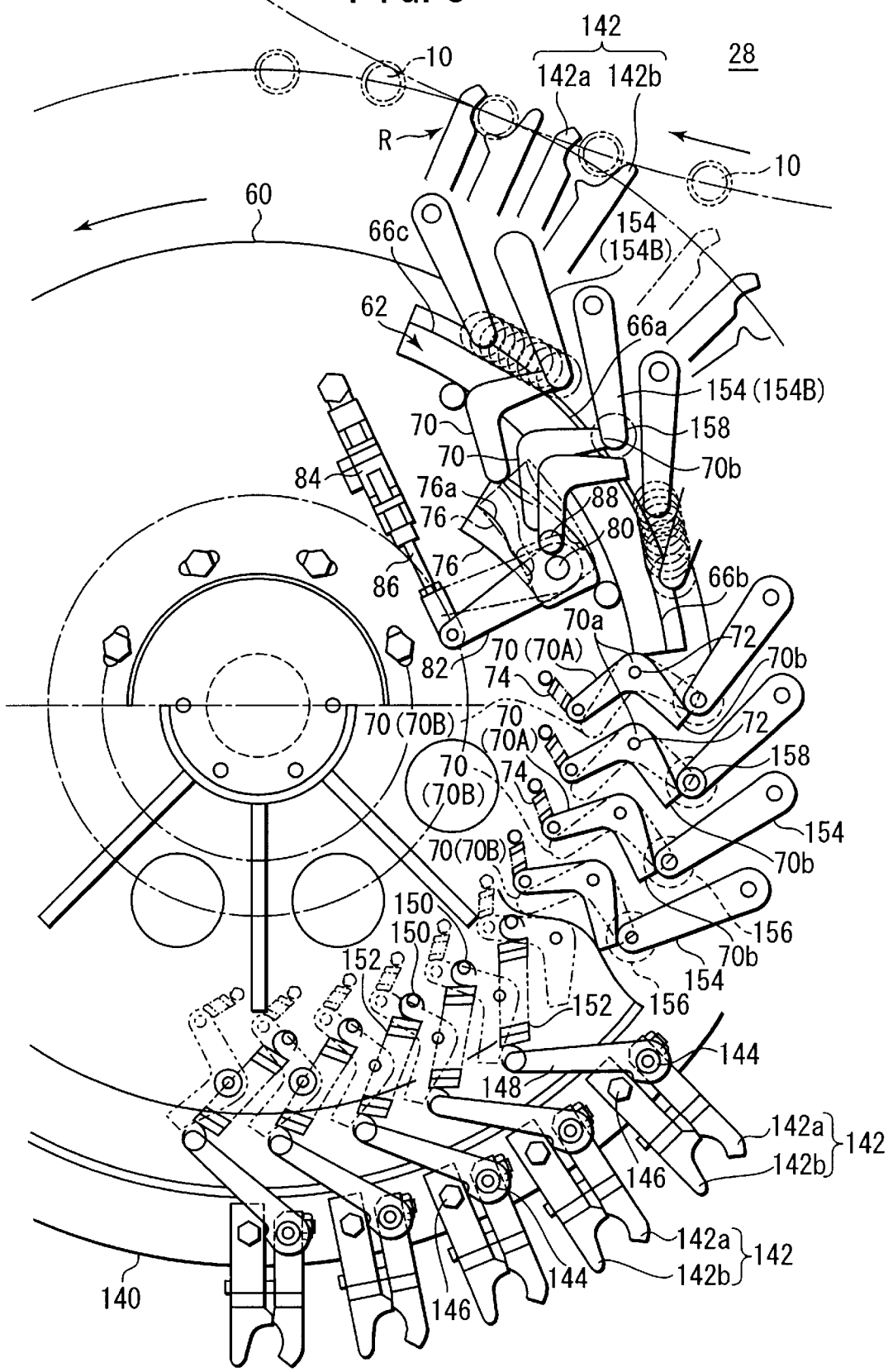
FIG. 8 is an enlarged view of part shown in FIG. 3.

The reject wheel 28 which is provided with the unlockable gripper means constructed in the manner mentioned above will now be described with reference to FIGS. 6 to 8. The reject wheel 28 includes a revolving body 128 having a rotary shaft 138 at its center, which fixedly carries at its top end a rotating plate 140, and a plurality of unlockable gripper means 130 are disposed at an equal circumferential interval along the outer periphery of the rotating plate 140. Each unlockable gripper means 130 includes a gripper 142 formed by a pair of arms 142a, 142b which can be opened or closed relative to each other. The gripper 142 is fixedly mounted on the top portion of a vertical support shaft 144 which vertically extends through the rotating plate 140 of the revolving body 128 to be rotatably mounted. More specifically, the gripper 142 comprises a movable arm 142a which can rotate with the support shaft 144, and a stationary arm 142b fixedly mounted on the upper end of a stationary shaft 146 (see FIG. 8) which extends through the rotating plate 140.

One end of an upper lever 148 is connected to the top end of the vertical support shaft 144, and a tension spring 152 extends between the other end of the lever and a pin 150 fixedly mounted on the rotating plate 140 toward the inner periphery thereof, thereby normally urging the upper lever 148, and hence the movable arm 142a which is fixedly mounted on the same support shaft 144 as the upper lever 148 in a direction toward the stationary arm 142b or in a direction to close the arms 142a, 142b of the gripper 142.

A lower arm 154 has its one end fixedly mounted on the bottom end of the support shaft 144 which extends through the rotating plate 140, and rotates in an integral manner with the movable arm 142a and the upper lever 148. At its other end, the lower lever 154 carries a first cam roller 156 on its lower surface and a second cam roller 158 on its upper surface.

A fixed plate 60 of a reduced diameter is fitted around the outer periphery of the rotary shaft 138 at a location below the rotating plate 140, and fixedly carries a pair of open/close cams 62, 64. One of the cams (hereafter referred to as a first open/close cam), 62, is intended to open or close the gripper 142 in order to take out the vessel 10 from the drier 8 when that vessel is to be rejected, and thus is disposed adjacent to the reject position R where the reject wheel 28 opposes the drier 8. The other cam (hereafter referred to as a second open/close cam) 64 is intended to open or close the gripper when the vessel 10 which is gripped by the unlockable gripper means 130 is allowed to drop onto a discharge chute 30, as will be described later, and thus is disposed at a discharge position D (see FIG. 7) where the reject wheel 28 overlaps the discharge chute 30.

Figure 6:
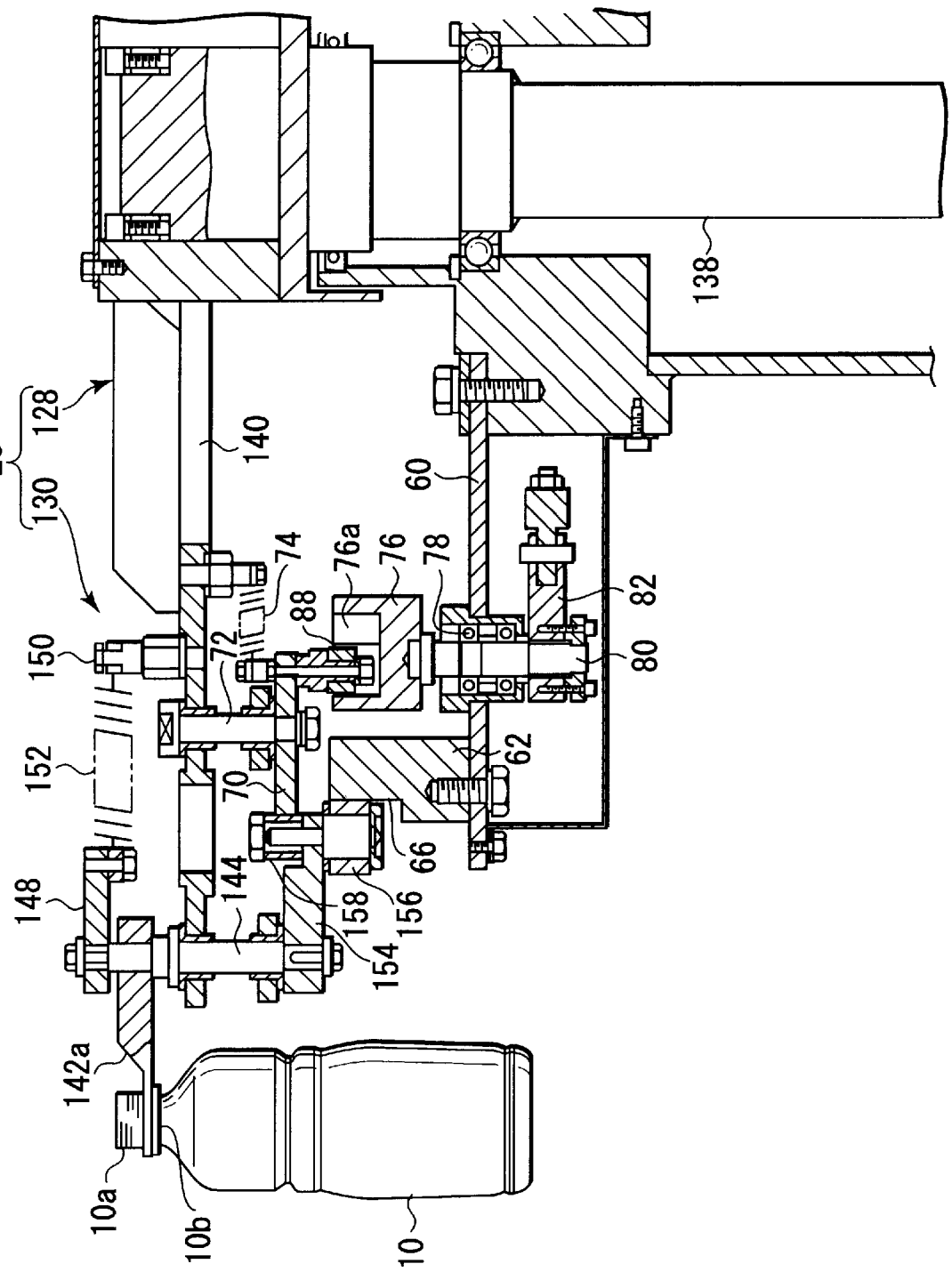
FIG. 6 is a longitudinal section of part of reject means used in the resin vessel conveying system.

Both the first and the second open/close cam 62, 64 are generally arcuate in configuration and have cam surfaces 66, 68 which are located at an elevation corresponding to the first cam roller 156 (see FIG. 6). Both the cam surfaces 66, 68 have peaks 66a, 68a centrally which project toward the outer periphery of the revolving body 128, and valleys 66b, 68b, 66c, 68c on the opposite sides or upstream and downstream of the peaks 66a, 68b. When the first cam roller 156 is engaged with the valleys 66b, 68b, 66c, 68c, the upper lever 148 is urged by the tension spring 152 to move the movable arm 142a toward the stationary arm 142b, thus closing the gripper 142. When the first cam roller 156 engages the peaks 66a, 68a, the lower lever 154 is driven toward the outer periphery of the revolving body 128, causing the vertical support shaft 144 and the movable arm 142 to rotate, thus opening the gripper 142.

A chevron-shaped rock lever 70 is mounted on the rotating plate 140 at a location radially inward of each gripper 142, and has a central bend 70a which is fixedly mounted on the lower end of a mounting shaft 72 which is rotatably mounted by extending through the rotating plate 140, thus allowing the rock lever to rock in opposite directions about the bend 70a. The rock lever 70 has an inner end which is disposed toward the center of the revolving body 128 and which is connected to a tension spring 74, whereby it normally assumes a position shown in FIG. 8 where it has rotated clockwise (see a rock lever shown in solid line in this Figure and designated by reference character 70 (70A)).

The end face of the outer end of the rock lever 70 defines a lock 70b which engages the second cam roller 158 mounted on the upper surface of the lower lever 154 to restrict the movement of the lower lever 154. When the inner end of the rock lever 70 is pulled by the tension spring 74, the lock 70b is disengaged from the second cam roller 158, and thus the lower lever 154 can rock in accordance with the profile of the open/close cam 62 without being restricted by the rock lever 70. When the rock lever 70 is forcibly rotated counter-clockwise against the resilience of the tension spring 74 (see a rock lever shown in phantom lines and designated by a reference character 70 (70B)), the lock 70b is engaged with the second cam roller 158, thus locking the lower lever 154 in a condition in which its inner end is urged toward the outer periphery of the revolving body 128. A condition in which the lock 70b of the rock lever 70 has locked the lower lever 154 is shown in an upper portion of FIG. 8 and designated by a reference character 154 (154B).

When the lock 70b of the rock lever 70 is not engaged with the second cam roller 158 on the lower lever 154, the lower lever 154 is freely rockable, thus allowing the gripper 142 to be opened and closed in accordance with a rocking motion caused by the first and second open/close cam 62, 64. This represents a condition when the vessel 10 is taken out from the drier 8 to be discharged or rejected. When the lock 70b of the rock lever 70 is engaged with the second cam roller 158 to lock the lower lever 154, the gripper 142 is maintained in its open condition independently from the open/close cams 62, 64, and this represents a condition which prevails during a normal production run where no vessel 10 is rejected.

A change-over cam 76 which switches between a reject operation in which the gripper 142 is opened and closed in accordance with the profile of the cam surfaces 66, 68 and a normal run in which the gripper 142 is maintained in its open condition is disposed radially inward of the first open/close cam 62. The change-over cam 76 is mounted on the top end of an operating shaft 80 which vertically extends through the fixed plate 60 and is rotatably mounted by means of a bearing 78. The lower end of the operating shaft 80 is fixedly connected to one end of an operating lever 82, the other end of which is connected to a piston rod 86 of an air cylinder 84.

The change-over cam 76 includes a channel-shaped cam surface 76a of a width which is wider toward the entrance (secured to the operating shaft 80 or upstream side) and narrower toward the exit or downstream side, and a change-over cam roller 88 which is mounted on the lower side of the inner end of the rock lever 70 is disposed to pass through the channel-shaped cam surface 76a. When the air cylinder 84 is actuated to extend the piston rod 86, the change-over cam 76 assumes a position shown in solid line in FIG. 8, pulling the change-over cam roller 88 which passes through the cam surface 76a radially inward to unlock the lower lever 154. When the piston rod 86 of the air cylinder 84 is retracted, the change-over cam 76 moves to its position shown in phantom lines in FIG. 8, urging the cam roller 88 which passes through the channel-shaped cam surface 76a radially outward, causing the lock 70b of the rock lever 70 to be engaged with the second cam roller 158 on the lower lever 154 to lock it.

Figure 2:
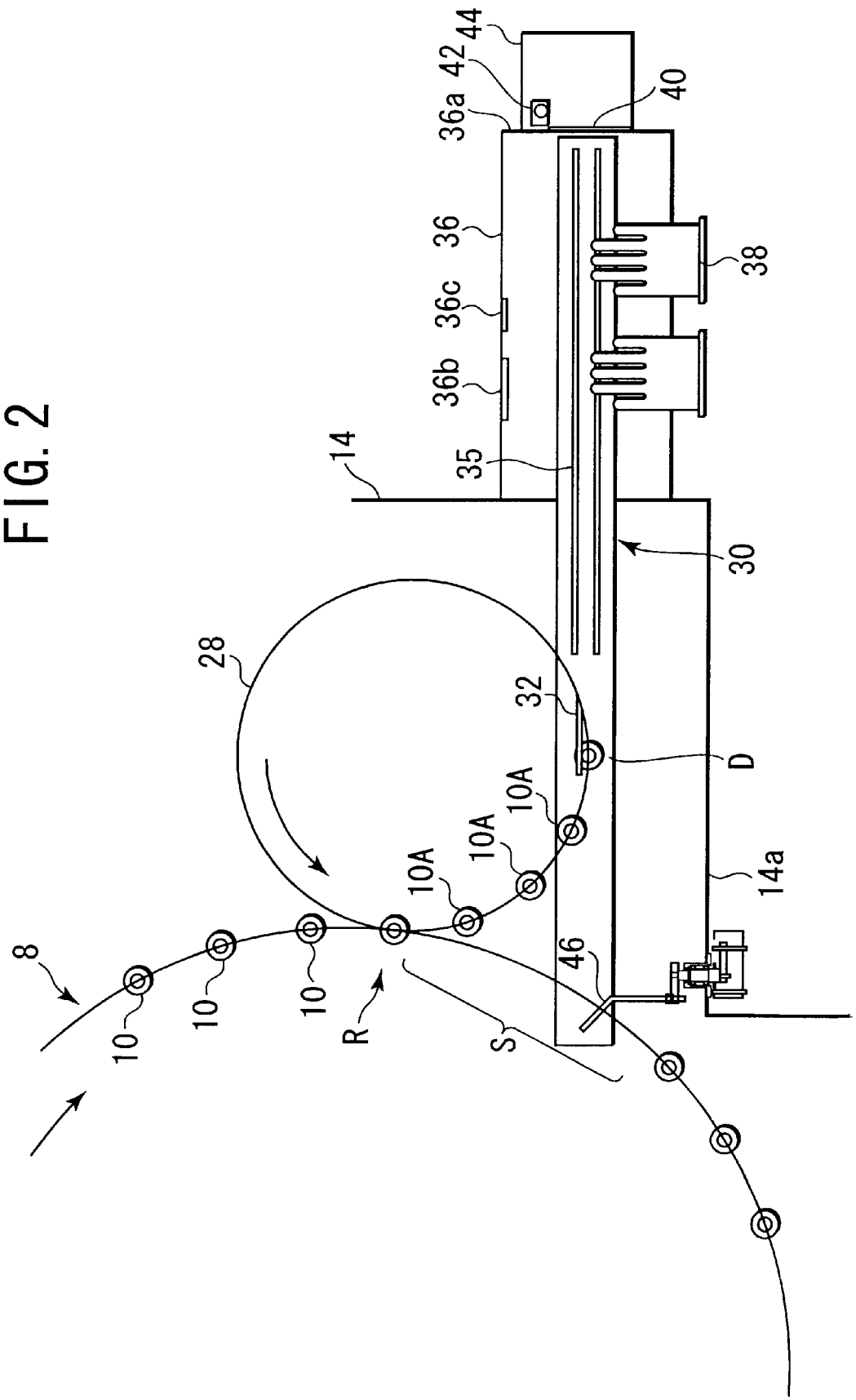
FIG. 2 is a plan view, to an enlarged scale, of part of the conveying system where a vessel is rejected.
Figure 3:
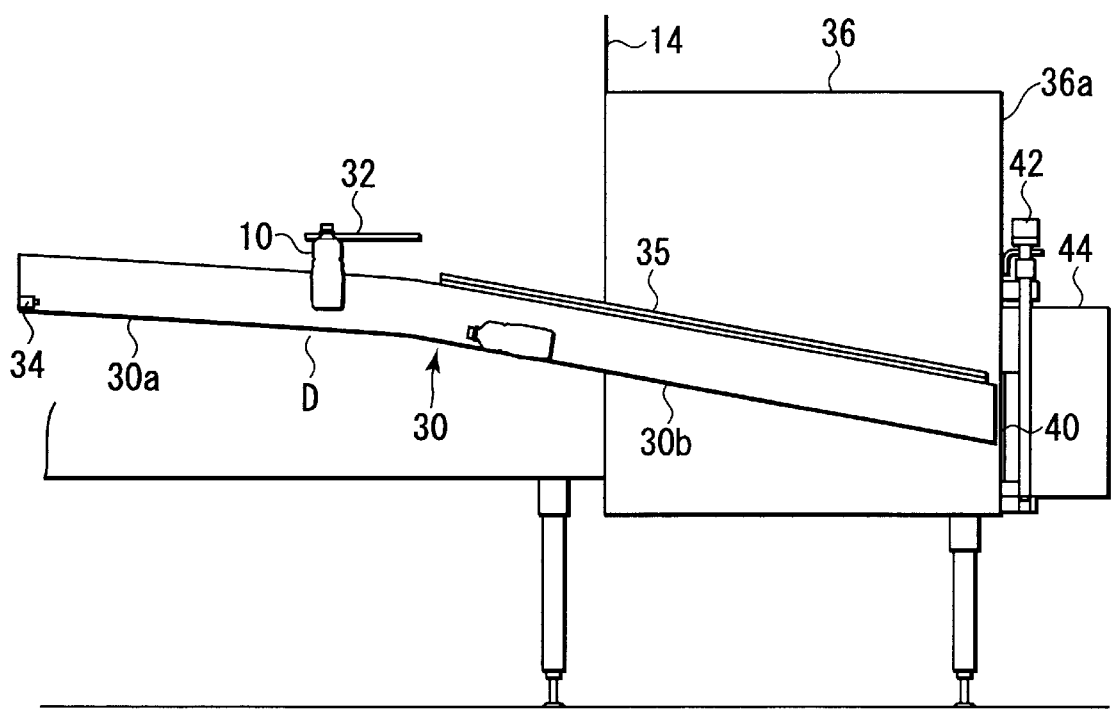
FIG. 3 is a side elevation of FIG. 2.

The discharge chute 30 is disposed laterally of and below the reject wheel 28, and the resin vessel 10 which is taken out of the drier 8 by the unlockable gripper means 130 on the reject wheel 28 is dropped onto the discharge chute 30 to be discharged externally. As shown in FIGS. 2 and 3, a stationary reject guide 32 is disposed at the discharge position D where the reject wheel 28 overlaps the discharge chute 30, and the resin vessel 10 which is taken up by the unlockable gripper means 130 on the reject wheel 28 is engaged with the reject guide 32 at the discharge position D as the unlockable gripper means 130 is opened, whereby it is forcibly dropped onto the discharge chute 30.

The discharge chute 30 is gently inclined, forming a small angle with respect to the horizontal in a upstream region 30a extending to the discharge position D where it receives the resin vessel 10 which drops down from the reject wheel 28, and is inclined with a greater gradient in a downstream region 30b which is located beyond the discharge position D. The chute 30 comprises a bottom surface and a pair of opposite side walls to define a U-shaped space, which receives the resin vessel 10 and causes it to slip down the downstream portion 30b of a greater gradient for purpose of discharge. The upstream end of the discharge chute 30 extends to a point located below the conveying path of the resin vessel 10 which is followed by the resilient gripper means 11 on the drier 8. A nozzle 34 is disposed at the upstream end for blowing an air stream in the downward direction, thus blowing the dropped resin vessel 10 in the downstream direction. An anti-jump rail 35 is located above the downstream portion 30b of the discharge chute for preventing the resin vessel 10 from jumping out of the chute 30.

It is to be understood that the upstream region 30a and the downstream region 30b of the discharge chute 30 are disposed within the sterile chamber 14 for the drier, and that the lower portion of the downstream region 30b extends to the outside of the sterile chamber 14, which is then surrounded by another sterile chamber 36 for the discharge chute 30. The sterile chamber 36 is provided with gloves 38 which allow an access to the discharge chute 30 while maintaining an isolation of the chamber 36 from the exterior.

The downstream end of the discharge chute 30 extends to a point close to an end wall 36a of the sterile chamber 36, which is provided with a door 40 which can be opened and closed. The door 40 is adapted to be rotated by a rotary actuator 42 for opening and closing it. The resin vessel 10 which is carried on the discharge chute 30 is taken out by opening the door 40. The door 40 is surrounded by a cover 44. Ports 36b, 36c are formed in the side wall of the sterile chamber 36 for ventilation purpose.

A reject arm 46 is disposed at a point within the drier 8 which is downstream of the reject wheel 28, but is upstream of the outlet wheel 26 for rejecting a resin vessel 10 which could not have been discharged by the reject wheel 28. As shown in FIG. 4, the reject arm comprises a pair of chevron-shaped arms 46a, 46b, which are mounted on a horizontal shaft 48 rotatably mounted in a sidewall 14a of the sterile chamber 14 by bearings 47, 49 so as to be swingable. A pair of oil seals 50, 52 are fitted over the horizontal shaft 48 both inside and outside the sterile chamber 14 to maintain a hermetic seal of the sterile chamber 14.

The end of the horizontal shaft 48 which projects externally of the sterile chamber 14 is connected through a rotating lever 54 to a piston rod 56a of a reject arm rotating cylinder 56. When the rotating cylinder 46 is actuated, the horizontal shaft 48 is driven for rotation, whereby the reject arm 46 swings up and down. When the reject arm 46 swings down, it is retracted to a position shown in phantom lines in FIG. 4 where it does not interfere with the resin vessel 10 which is being conveyed as retained by the resilient gripper means 11 on the drier 8. When the reject arm 46 swings up, it projects into the conveying path of the resin vessel 10 to be engageable with a barrel 10c of the resin vessel 10 as shown in solid lines in FIG. 4, thus permitting the resin vessel which has been conveyed within the drier 8 to be taken out from the resilient gripper means 11.

In the present embodiment, during a normal production run, the reject arm 46 is retracted to its down position. However, when the vessel processing line has stopped for a given time interval, and a reject signal is issued for rejecting resin vessels 10 which stay within the drier, the reject arm rotating cylinder 46 is actuated at a given time interval thereafter, causing the reject arm 46 (arms 46a, 46b) to swing upward, thus causing it to project into the conveying path of the resin vessel 10 in the drier 8.

The operation of the resin vessel conveying system described above will now be described. Resin vessels 10 which are conveyed on the air conveyor 2 while the lower surface of their flanges 10b are supported are supplied through the inlet wheel 20 into the rinser 6 located within the sterile chamber 12. After being rinsed by the rinser 2, the resin vessels 10 are handed over to the air conveyor 2 again through the outlet wheel 22. The resin vessels 10 carried on the air conveyor 2 are then supplied into the drier 8 disposed within the sterile chamber 14 through the second inlet wheel 24. As mentioned previously, the second inlet wheel 24 carries a plurality of unlockable gripper means, each of which can be opened and closed to grip one of the resin vessels 10. In this manner, the unlockable gripper means grips one of the resin vessels 10 and hands it over to the drier 8.

The drier 8 includes resilient gripper members 11, each operating to hold a resin vessel 10 sandwiched under the resilience of a spring, and the resin vessels 10 which are handed over from the second inlet wheel 14 are conveyed while one of the vessels is gripped by the resilient gripper member 11. In the present embodiment, the unlockable gripper means on the second inlet wheel 24 grips an upper portion of the resin vessel 10 located above the flange 10b while the resilient gripper means 11 on the drier 8 grips a lower portion of the resin vessel 10 located below the flange 10b around the neck 10a.

During a normal production run, the unlockable gripper means 130 on the reject wheel 28 are locked to be always in an open condition, and accordingly, the resin vessel 10 which is gripped by the resilient gripper means 11 on the drier 8 simply passes by the reject position R and is then handed over to the air conveyor 2 through the second outlet wheel 26. Subsequently, the resin vessel is conveyed on the air conveyor 2 to be delivered from the processing chamber 4 to a subsequent step.

In the event the vessel processing line stops for a given time interval as by a failure or the like, there is a likelihood that the resin vessels 10 which are already conveyed to points downstream of the reject wheel 28 in the sterile chamber 14 may be deformed under heat and cannot be used to provide products. Accordingly, all of the resin vessels 10 which are retained by the resilient gripper means 11 located downstream of the reject wheel 28 must be rejected by the operation of the reject wheel 28. In response to a reject signal which commands the initiation of a reject operation for the resin vessels, the unlockable gripper means 130 on the reject wheel 28 are unlocked to permit their opening and closing, and become opened and closed at given positions as the revolving body 128 rotates. Specifically, the unlockable gripper means 130 has its both arms 142a, 142b maintained open until the reject position R is reached, and as the reject position R is approached, the resin arm 10 which has been retained by the resilient gripper means 11 on the drier 8 is inserted between the both arms 142a, 142b, whereupon the both arms 142a, 142b are closed together by the action of the open/close cam 62, thus gripping the resin vessel 10. Subsequently, as both the drier 8 and the reject wheel 28 continue to rotate and the resilient gripper means 11 on the drier 8 which retains the resin vessel 10 and the unlockable gripper means 130 on the reject wheel 28 which also retains the same vessel move apart, the resin vessel 10 is extracted from the resilient gripper means 11 on the drier 8 and is solely retained by the unlockable gripper means 130 on the reject wheel 28.

When the resin vessel 10 which is retained by the unlockable gripper means 130 on the reject wheel 28 moves to a position above the discharge chute 30 (or the discharge position D), the unlockable gripper means 130 is opened and the stationary reject guide 32 drops it onto the discharge chute 30. The air blowing nozzle 34 is disposed at the upstream end of the discharge chute 30, and accordingly, the resin bottle 20 which is dropped onto the discharge chute is blown toward the downstream portion 30b while slipping along the discharge chute 30. The anti-jump rail 35 is disposed above the downstream portion 30b of the discharge chute 30, preventing the resin vessel 10 from jumping out of the discharge chute 30 as it is blown off.

At a given time interval after the reject signal is input in order to initiate the reject operation, the reject arm rotating cylinder 56 is actuated, whereby the reject arm 46 which has been retracted at its position which is out of the conveying path of the resin vessel 10 swings upward to project into the conveying path. It will be appreciated that if the reject arm 46 is operated to swing immediately upon receiving the reject signal, the reject arm would collide with the resin vessels 10 which are being conveyed within the drier 8, but those resin vessels 10 which are positioned close to the reject wheel 28 are subject to less deformation if they are deformed, and thus can be positively gripped and discharged by the unlockable gripper means 130 on the reject wheel 28 (see resin vessels designated by reference character 10A in FIG. 2). Thus, during the given time interval which precedes the actuation of the cylinder 56, there is a space S downstream of the reject wheel 28 where there is no resin vessel 10, and thus upon actuation of the cylinder 56, the reject arm 56 can be moved into the space S (see FIG. 2).

As mentioned previously, when the resin vessel 10 continue to be heated for a long time while it remains at rest, not only the barrel 10c, but the neck 10a of the vessel 10 will be largely deformed. Such resin vessel 10 cannot be grasped by the unlockable gripper means 130 on the reject wheel 28, and thus would be conveyed downstream of the reject wheel 18 while being retained by the resilient gripper means 11 on the drier 8. However, when there is the reject arm 46 which projects into the conveying path, such resin vessel 10 will be forcibly taken out from the resilient gripper means 11 to be dropped onto the discharge chute 30. The resin vessel 10 dropping onto the discharge chute 30 is blown off by the air nozzle 34 to slip down the discharge chute 30.

It will be seen that in the arrangement of the present embodiment, the provision of the reject arm 46 downstream of the reject wheel 28 allows any resin vessel 10 which has been severely deformed up to its neck 10a as a result of prolonged heating can be positively rejected if it has passed the reject position R as a result of a failure of the reject wheel 28 to reject it. In this manner, defective vessels 10 can be rejected in a consecutive manner, avoiding that such vessels continue to be conveyed on the vessel processing line. In addition, there is no need for a manual intervention to remove defective vessels 10.

In addition, because the discharge chute 30 which receives and discharges the rejected resin vessels 10 is constructed as a cage-like structure in which the vessels are dropped and discharged, rather than a discharge chute of neck supporting type as disclosed in Japanese Patent Application No. 119,935/2,000 in which the vessels are conveyed while the lower surface of their flanges are supported, it is assured that even a resin vessel 10 having a deformed neck 10a can be positively slipped down to be discharged.

The resin vessel 10 which has slipped down to the downstream end of the discharge chute 30 is taken out by opening the door 40. If the resin vessels 10 are jammed on the downstream portion 30b of the discharge chute 30 having a greater gradient, the gloves 38 may be used to remove the trouble while maintaining the sterile condition undisturbed.

In the above description, the resilient gripper means 11 on the drier 8 grips the resin vessel 10 at a location below the flange 10b while the unlockable gripper means 130 on the reject wheel 18 grips the resin vessel 10 at a location above the flange 10b, but the locations gripped by the respective gripper means may be reversely arranged.

In the described arrangement, the reject arm 46 is caused to project into the conveying path of the resin vessel 10 at a given time interval after the reject signal is issued. However, the reject arm 46 may be projected into the conveying path upon detecting the presence of the space S therein by a sensor.

What is claimed is:

1. A resin vessel conveying system comprising a rotary conveying means including a plurality of resilient gripper means disposed at an equal circumferential interval on a revolving body and resiliently gripping a resin vessel at a location above or below a flange formed on the vessel while the latter is being conveyed, and a rotary reject means including a plurality of unlockable gripper means disposed at an equal circumferential interval on a revolving body and each operable to be opened or closed to release or grip a resin vessel; the resin vessel conveying system further comprising a reject arm disposed at a location downstream of the rotary reject means on a conveying path of the resin vessel and movable into and out of the conveying path, the reject arm operating to take a resin vessel which failed to be taken out from the rotary conveying means out of the conveying path in response to a reject signal.

2. A resin vessel conveying system according to claim 1 in which the reject arm is caused to project into a space in the conveying path which is created by the operation of the rotary reject means to take out a resin vessel.

3. A resin vessel conveying system according to claim 2 in which the reject arm is swingable up and down, the reject arm retracting to a position where it does not interfere with the vessel being conveyed when it swings down and projecting into the conveying path when it swings up.

4. A resin vessel conveying system according to claim 1 in which one of the resin vessels which is taken out by the reject arm is discharged on a chute including an upstream portion of a gentle gradient and a downstream portion of a greater gradient.

5. A resin vessel conveying system according to claim 4, further comprising a nozzle disposed at the upstream end of the chute for blowing an air stream directed in the downstream direction, thereby blowing the vessel which is taken out in the downward direction.

6. A resin vessel conveying system according to claim 4 in which the chute is disposed in a sterile chamber in which a glove is disposed which is accessible from the outside while maintaining the sterile chamber in an isolated condition.

7. A resin vessel conveying system according to claim 6 in which the sterile chamber is formed with a port for ventilation purpose.

* * * * *